United States Patent
Krishnamurthy et al.

(10) Patent No.: US 10,382,281 B1
(45) Date of Patent: Aug. 13, 2019

(54) RULE BASED IPV4 TO IPV6 MIGRATION ASSISTING FRAMEWORK

(71) Applicant: HCL Technologies Limited, Chennai (IN)

(72) Inventors: Shashidhar Krishnamurthy, Noida (IN); Mukta Agarwal, Noida (IN); Saurabh Chattopadhyay, Noida (IN); Banish Bansal, Noida (IN); Shailender Govil, Noida (IN)

(73) Assignee: HCL TECHNOLOGIES LIMITED, Chennai (IN)

( * ) Notice: Subject to any disclaimer, the term of this patent is extended or adjusted under 35 U.S.C. 154(b) by 0 days.

(21) Appl. No.: 14/228,257

(22) Filed: Mar. 28, 2014

(30) Foreign Application Priority Data

Jun. 26, 2013 (IN) .......................... 2803/CHE/2013

(51) Int. Cl.
*G06F 15/173* (2006.01)
*H04L 12/24* (2006.01)
*G06F 16/28* (2019.01)

(52) U.S. Cl.
CPC ............ *H04L 41/12* (2013.01); *G06F 16/285* (2019.01)

(58) Field of Classification Search
CPC ....... H04L 41/12; H04L 61/251; H04L 12/26; G06F 16/285
See application file for complete search history.

(56) References Cited

U.S. PATENT DOCUMENTS

| | | | |
|---|---|---|---|
| 2008/0075114 A1* | 3/2008 | Mo | H04L 29/12358 370/466 |
| 2013/0282901 A1* | 10/2013 | Mouravyov | H04L 41/0853 709/224 |
| 2014/0317269 A1* | 10/2014 | Munoz de la Torre Alonso | H04L 47/20 709/224 |

* cited by examiner

*Primary Examiner* — John B Walsh
(74) *Attorney, Agent, or Firm* — Mannava & Kang, P.C.; Vinay Malik

(57) ABSTRACT

A method and system for rule based Internet Protocol version 4 (IPv4) to Internet Protocol version 6 (IPv6) migration assisting framework is disclosed. The method provides guidance and assistance for migrating a product, a system or the like to IPv6. The method views across the complete development life cycle, not restricting only to the impacted code base of the system artifacts. The method scans the system artifacts for IPv4 dependency detection and then provides IPv4 Dependency Removal Effort Estimation (IDRE). The IPv4 dependency detection is based on pre-defined Meta-rules constructed with respect to the context of product. The IDRE combines Analysis Effort (AE) and Project Execution Effort (PEE) to provide a user and/or the organization order of magnitude estimate based on the assessment of IPv4 dependencies, level of coupling with IPv4 dependencies against different parts of the system artifacts.

16 Claims, 6 Drawing Sheets

RULE BASED IPV4 TO IPV6 MIGRATION ASSISTING FRAMEWORK

The present application is based on, and claims priority from, IN Application Number 2803/CHE/2013, filed on 26 Jun. 2013, the disclosure of which is hereby incorporated by reference herein

FIELD OF INVENTION

The embodiments herein relate to code migration and, more particularly, to Internet Protocol Version 4 (IPv4) to Internet Protocol Version 6 (IPv6) migration assisting framework.

BACKGROUND

Exponential rise in number of communication devices, convergence and development of new Internet Protocol (IP) networks and IP-based services is leading the Internet world towards exhaustion of available Internet Protocol (IP) addresses. The existing Internet Protocol Version 4 (IPv4) supports only 32 bit IP address space. The emerging next generation IP, Internet Protocol Version 6 (IPv6) supports 128 bit address space to accommodate future demand for IP addresses. However, deployment of IPv6 is not backwards compatible with IPv4 and either both the protocols must be deployed or sophisticated tunneling and translation systems have to be set-up. Thus, migration to IPv6 at earliest is advisable. The deployment of IPv6 by migrating from IPv4 is long and complex integration process involving training, configuration, testing, management costs, cost of software and hardware upgrades and the like. Operational costs such as staff training is a major contributor in overall cost for upgrading to IPv6 since upgrading demands expertise. Moreover, lot of engineering and R&D effort goes in identifying the right strategy for upgrading a system or a product to IPv6.

Conventional mechanisms such as Network Address Translation-Protocol Translation (NAT-PT) only provide a stop gap arrangement for IPv4 to IPv6 migration scenario. Existing mechanisms for migration of legacy IPv4 code to IPv6 provide various standards and technology guidance to define the IPv6 networking technology and potential needs.

The existing methods provide code scanning procedures to detect IPv4 dependencies in the code to be migrated. An IPv4 dependency describes the changes or possible impact areas that an IPv4 compatible application must make so that it can operate in an IPv6 networking environment. With existing methods, once the IPv4 dependencies are identified, manual effort has to be put in for analyzing the impact of the detected IPv4 dependencies on the code. However, existing legacy codes being tightly coupled to IPv4, manually figuring out the overall impact of IPv4 dependency on the code of a system or product code is tedious and complex. Practically, very lower percentage of overall impact can be identified. Thus, lack of proper methodology for reducing IPv4 dependencies in the code translates to heavy spending by the organization in identifying the right path and solution for IPv6 migration.

Some existing methods provide an extent of automated detection of IPv4 dependencies using standard tools with common approach for code migration of certain system or product. However, these existing methods are unable to address most of the indirect IPv4 dependencies and require revisiting the code to discover such dependencies using trial and error approach. Some existing methods provide transformation work load requirement during migration to IPv6 by providing computation of effort required in general, but fail to provide context specific analysis.

In the light of above discussion, a system and method for automatically detecting IPv4 dependencies in the code to provide product or system context specific effort computation to the organization for IPv4 to IPv6 migration is appreciated.

SUMMARY

In view of the foregoing, an embodiment herein provides a method for assisting migration of a network from Internet Protocol version 4 (IPv4) to Internet Protocol version 6 (IPv6), wherein the method comprises defining a meta rule base comprising a plurality of rules for assisting the migration of a plurality of system artifacts associated with the network; constructing a context specific rule bank from the rule based meta rule base for each of the plurality of system artifacts; detecting a plurality of IPv4 dependencies in each of the plurality of system artifacts using corresponding context specific rule bank; and calculating an IPv4 Dependency Removal Effort Estimation (IDRE) for each of the plurality of system artifacts based on the detected IPv4 dependencies.

Embodiments further disclose a system for assisting migration of a network from Internet Protocol version 4 (IPv4) to Internet Protocol version 6 (IPv6), wherein the system is configured for defining a meta rule base comprising a plurality of rules for assisting the migration of a plurality of system artifacts associated with the network using a migration assistance framework; constructing a context specific rule bank from the meta rule base for each of the plurality of system artifacts using the migration assistance framework; detecting a plurality of IPv4 dependencies in each of the plurality of system artifacts using corresponding context specific rule bank using the migration assistance framework; and calculating an IPv4 Dependency Removal Effort Estimation (IDRE) for each of the plurality of system artifacts based on the detected IPv4 dependencies using migration assistance framework.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF INVENTION

Figure 1:
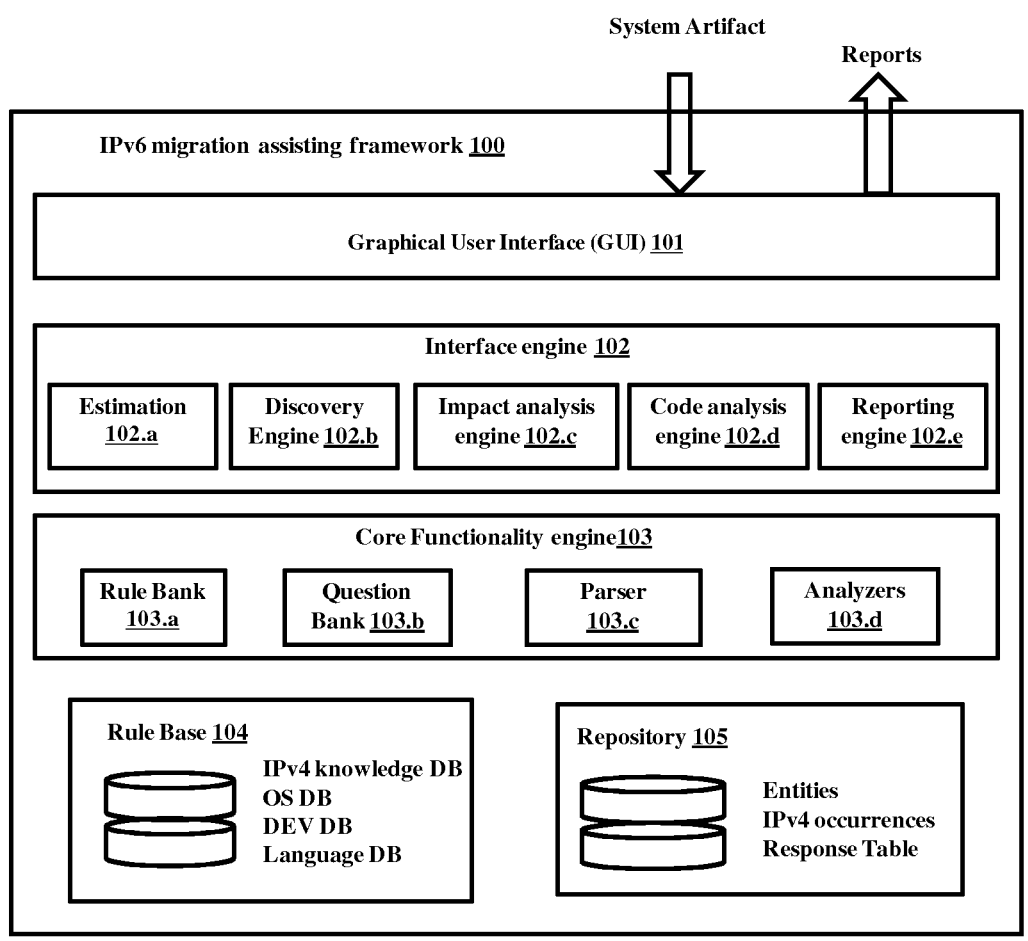
FIG. 1 illustrates an architecture for IPv6 migration assisting framework, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method and system for rule based Internet Protocol version 4 (IPv4) to Internet Protocol version 6 (IPv6) migration assisting framework for code to be migrated to IPv6. The code can be a system, or a product code or the like. The method views across the complete development life cycle, not restricting only to the impacted code base in system artifacts. The system artifacts are thoroughly examined by scanning the system artifacts and all related work products using Meta rule based IPv4 dependency detection. The detected IPv4 dependencies are analyzed to provide IPv4 Dependency Removal Effort Estimation (IDRE) for the system artifacts. The system artifacts are one of many kinds of tangible by-products produced during the development of code.

The IPv4 dependency detection is based on the Meta-rules which are predefined by the IPv6 migration assisting framework (framework) 100. The method scans the Meta rules to design product or system context specific rule bank that is utilized for IPv4 dependency detection and IDRE. The rules are designed with respect to the context of product, domain, OS, programming languages of the system artifacts. Once the IPv4 dependencies are detected in the system artifact, an IPv4 occurrence analysis is performed using rule-based weightage procedure. The IDRE combines Analysis Effort (AE) and Project Execution Effort (PEE) to provide a user and/or the organization order of magnitude estimate based on the assessment of IPv4 dependencies, level of coupling with IPv4 dependencies and the like against different parts of the system artifacts, and different implementation aspects of the system artifacts.

The method the framework to adaptively learn from system artifacts and a survey model. The survey model enables interaction with the user using questionnaire comprising one or more levels of question set. The user responses to the questionnaire are one of the inputs for constructing product or system context specific rules for the system artifact under consideration. The context specific rules are used to identify second and/or third party dependencies and protocol compliances of the system artifacts.

Thus, the method disclosed delivers guidance and assistance to different departments such as system engineering, development, testing, documentation, training, sales, product management and the like at various phases code migration. The method disclosed analyzes anticipated change of the system artifacts for current and new deployment scenarios by scanning the system artifact for its entire ecosystem. Thus, the method identifies potential changes or impact areas at the early stage of project (IPv4 to IPv6 migration) execution. It helps in reducing the overall project timelines by accelerating the requirement analysis, design and development phases of a project. The method helps to reduce the engineering effort for projects to support IPv6 by eliminating IPv4 dependencies and optimizes the R&D budget and usage in the project. The method uniquely translates technology know-how and experience to a set of automated methods and reduces the personnel dependency effectively reducing the manual errors. The method self-adapts during run-time and provides assistance dynamically. The method provides an extensible rule-bank and knowledge base, which can be easily extended with all the project-based domain-wise learning.

Throughout the description the terms occurrence and dependencies are used interchangeably.

Throughout the description the terms product context and system context are used interchangeably.

Referring now to the drawings, and more particularly to FIGS. 1 through 6, where similar reference characters denote corresponding features consistently throughout the figures, there are shown embodiments.

FIG. 1 illustrates architecture for rule based IPv6 migration assisting framework, according to embodiments as disclosed herein. The figure depicts the a framework 100 comprising a Graphical User Interface (GUI) 101 and plurality of functionalities further comprising an interface engine 102, a core functionality 103, a rule base 104 and a repository 105. The interface engine 102 further comprise an estimation 102.$a$, a discovery engine 102.$b$, an impact analysis engine 102.$c$, a code analysis engine 102.$d$ and a reporting engine 102.$e$. The core functionality 103 further comprises a rule bank 103.$a$, a question bank 103.$b$, a parser 103.$c$ and analyzers 103.$d$.

The graphical user interface 101 enables the user to access to the IPv6 migration assisting framework 100. The discovery engine 102.$b$ and the impact analysis engine 102.$c$ utilize the rule bank 103.$a$ to select questionnaire from the question bank 103.$b$. The questionnaire is displayed to the user using the GUI 101. The rule bank 103.$a$ comprises product specific rules which are formulated by scanning the predefined Meta rules. The rule bank 103.$a$ and analyzer 103.$d$ utilize the rule base 104. The rule base 104 is a repository with Data Base (DB) which includes but is not limited to the IPv4 dependency detection rules for—DB products, Operating System (OS products), Development (DEV) environment specific products and programming language specific products. The framework 100 runs on multiple platforms such as windows, Linux, Vxworks or the likes.

In an embodiment the questionnaire comprises of one or more levels with set of questions in every level formed in a way to derive in depth information of the system artifacts. The multiple levels of the questionnaire enable to better interpret the system artifacts requirements and accordingly design the context specific rules for the system artifact under consideration.

The code analysis engine 102.$d$ scans and analyzes the code of the system artifacts received through the GUI 101.

The estimation 102$a$ functionality is based on derived product context specific rules in the rule bank 103.$a$ and applies weightage to the rules based on predefined criterion for each of the derived product context specific rules. The estimation 102.$a$ provides an interface for estimation functionality of the analyzers 103.$d$. The estimation 102.$a$ estimates the effort required to eliminate IPv4 dependencies from code base, documents and the like which, the organization produces as a part of the product. The weightages are further provided to the analyzers 103.$d$. The parser 103.$c$ parses the product specific rules derived for the system artifacts to the analyzer 103.d and builds entity (software entity) in repository 105 for corresponding software artifact. The analyzer 103.d of the core functionality 103 analyzes the parsed code of the system artifacts. The reporting engine 102.e prepares reports and provides the analyzed reports to the user through the GUI 101.

In an embodiment, the core functionality has one or more parsers. For example, one parser is provided for each possible development language and OS.

All the functional elements of framework 100 utilize the repository 105 that includes but is not limited to all IPv4 occurrences, entities and response table. The IPv4 occurrences are the repository that maintains information of all detected IPv4 dependencies for the various system artifacts that have been analyzed. The entity is a data structure that characterizes the segment of software artifact where the IPv4 dependency is detected. The response table is a repository that maintains responses of the user to the questionnaire.

In an embodiment, the various functionalities of the framework 100 can be implemented by software, a firmware or a hardware module or combination thereof.

Figure 2:
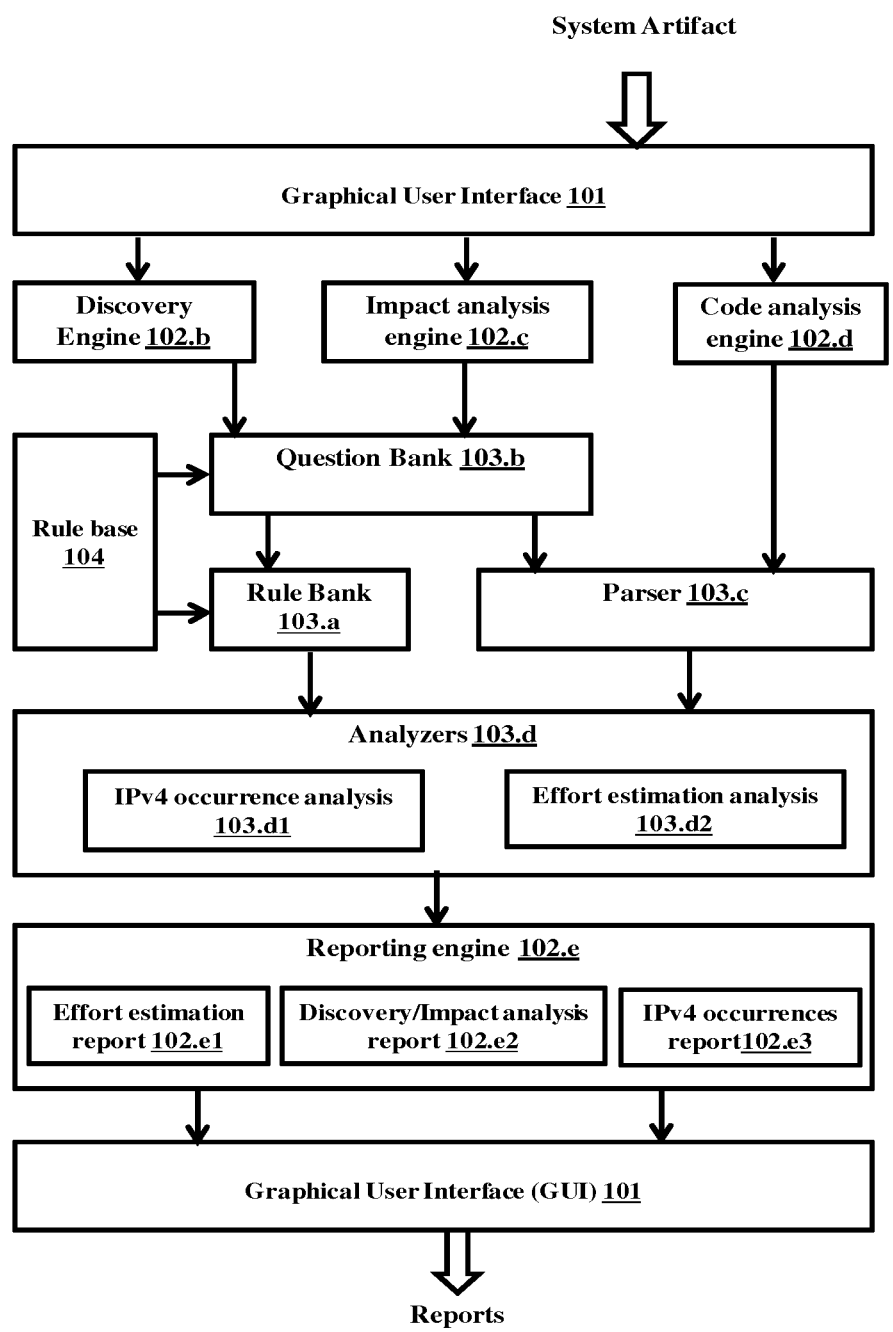
FIG. 2 illustrates a detailed functional diagram of the IPv6 migration assisting framework, according to embodiments as disclosed herein.

FIG. 2 illustrates a detailed functional diagram of the rule based IPv6 migration assisting framework, according to embodiments as disclosed herein. The figure depicts the GUI 101, the discovery engine 102.b, the impact analysis engine 102.c, the code analysis engine 102.d, the rule bank 103.a, the question bank 103.b, the parser 103.c, the analyzers 103.d and the reporting engine 102.e. The analyzers 103d further comprise an IPv4 occurrence analysis 103.d1 and an effort estimation analysis 103.d2. The reporting engine further comprises an effort estimation report 102.e1, a Discovery/Impact analysis report 102.e2 and an IPv4 occurrences report 102.e3.

Whenever, the GUI 101 of the frame work 100 receives system artifacts to be scanned, the discovery engine 102.b and the impact analysis engine 102.c formulates questionnaire for the user to be displayed through the GUI 101. The questionnaire comprises survey questions to derive the product context for the received system artifacts. The questions are derived from the question bank 103.b. The questions are linked in the way the product context is evaluated which, in turn are related to the way the rule bank 103.a defines rule for the product code.

The rules are derived by scanning the predefined Meta rules, where by a predefined transformation logic transforms the Meta rules to product context specific rules. The transformation logic is derived from the IPv4 dependency knowledge base, which is the repository in the rule base 104. For example, if the product relates to storage function the questions derived for each level of the questionnaire narrow down to the product context. The questions are not focused on networking or any other context but rather to the storage context of the product under consideration. The questionnaire has one or more levels and the set of question at each level are based on user responses to the questions in the previous level. The previous response knowledge is used to narrow down to product context. The responses are stored in the response table of the repository 105.

The method disclosed does not restrict to specific domain and the questionnaire formulated varies based on domain and portfolio of the product to be migrated to IPv6. A table 1 below, provides a sample set of questions in first column, functionalities of the interface engine that generates the questions for the user in second column and expected responses of the user in third column.

TABLE 1

| Question Sample | Interface Engine | Expected Response |
|---|---|---|
| Solution portfolio name? | Discovery | Unified Communication, Data Center Services, End Point Services, M2M, Video Networking, Web Server, Media & Entertainment, Transport, Sensor Network Satellite Network, Other |
| Product/Portfolio Target For? | Discovery | Enterprise Network, Carriers Network, Residential Network, Data Center Network, Internet |
| Product Category Class? | Discovery | Software, Hardware, Embedded |
| Product Belongs to Which Class? | Discovery | Host, Net Appliance, Server, Router, Intermediate Gateway, L3 Switch, Information Assurance Device |
| What is the current stage of IPv6 in Organization? | Discovery | Exploratory, Concept, Already Identify, R&D |
| Migration Required? | Discovery | Partial Migration, Full Migration |
| Are skills available in organization at engineering and deployment level for IPv6? | Discovery | Yes, No |
| Migration Scope Includes? | Discovery | Migration Engineering, Customer Support, Deployment, Validation, RFC Compliance, Services |
| Identify all the use cases which involve networking? | Discovery | Text |
| Identify the critical modules under the scope of migration? | Discovery | Text |
| Identify the 3rd Party Source Dependencies? | Discovery | Text |
| What's the upgrade scenario? | Discovery | Text |
| Does the product have user interface that takes IP Address as input? | Impact Analysis | Yes, No |

TABLE 1-continued

| Question Sample | Interface Engine | Expected Response |
| --- | --- | --- |
| Does the Product stores any information including IP Address in files? | Impact Analysis | Yes, No |
| Does the Product Run the private protocol with a peer containing IP-address specific information in the message flow? | Impact Analysis | Yes, No |
| Does the product use DBMS? | Impact Analysis | Yes, No |
| Which Operating system is used to run? | Impact Analysis | Windows, Linux, VxWorks, Other |
| Which Language is used? | Impact Analysis | C/C++, Java, Perl, Python, C#, Other |
| Line of Code (LOC)? | Impact Analysis | Text |
| Does the product use FTP or TELNET? | Impact Analysis | FTP, TELNET, BOTH, N.A. |
| Does the product Use HTTP/HTTPS/HTTP Streaming? | Impact Analysis | Yes, No |
| Does the product use SNMP? | Impact Analysis | Yes, No |
| Does the product using QOS Software? | Impact Analysis | Yes, No |
| Migration Required Dual Stack Support or IPv6 only? | Impact Analysis | IPv6, Dual Stack |
| IPv6 Migration Required the product support IPv6 Stateless Address Auto Configuration (SLAAC)? | Impact Analysis | Yes, No |

In an embodiment, the method provides the user with options to either save the response in the response table of the repository 105 or reset the response windows with default values provided by the frame work 100.

Once the product context is derived, the code analysis engine 102.d provides the interface to orient the lexical attributes of the code (source code) and recognizes the nature of adoption of underlying programming principles of the code. The programming principles such as pass by value and/or reference across functions, polymorphism implemented, and use of inheritance and encapsulation, and exception or error checking procedures implemented and the like are recognized. The parser 103.c then scans the code of the system artifacts by taking into consideration the knowledge requirements extracted by the code analysis engine 102.d. The parser 103.c receives the user responses from question bank 103.b and builds the entity for the scanned system artifact using the responses.

In an embodiment, the entity comprises a module, method of the module and IPv4 notation for type of the detected IPv4 dependency and the like.

Based on the predefined rules for the parser 103.c, the parser 103.c provides lexical analysis of the languages used by the system artifacts.

In an embodiment, the language information can be provided by the organization administration during the initial set up of the framework 100.

The analyzer provides IPv4 occurrence analysis 103.d1 and effort estimation analysis 103.d2 by applying rules from product context specific rule bank 103.a on the parsed code from the parser 103.c. The effort estimation analysis 103.d2 is core estimation functionality and is accessed through the interface provided by estimation 102.a. The reporting engine 102.e receives the analysis from the analyzers 103.d and the various reports are generated by the effort estimation report 102.e1, the discovery/impact analysis report 102.e2 and the IPv4 occurrences report 102.e3 functionalities. The reports are displayed to the user through the GUI 101.

Figure 3:
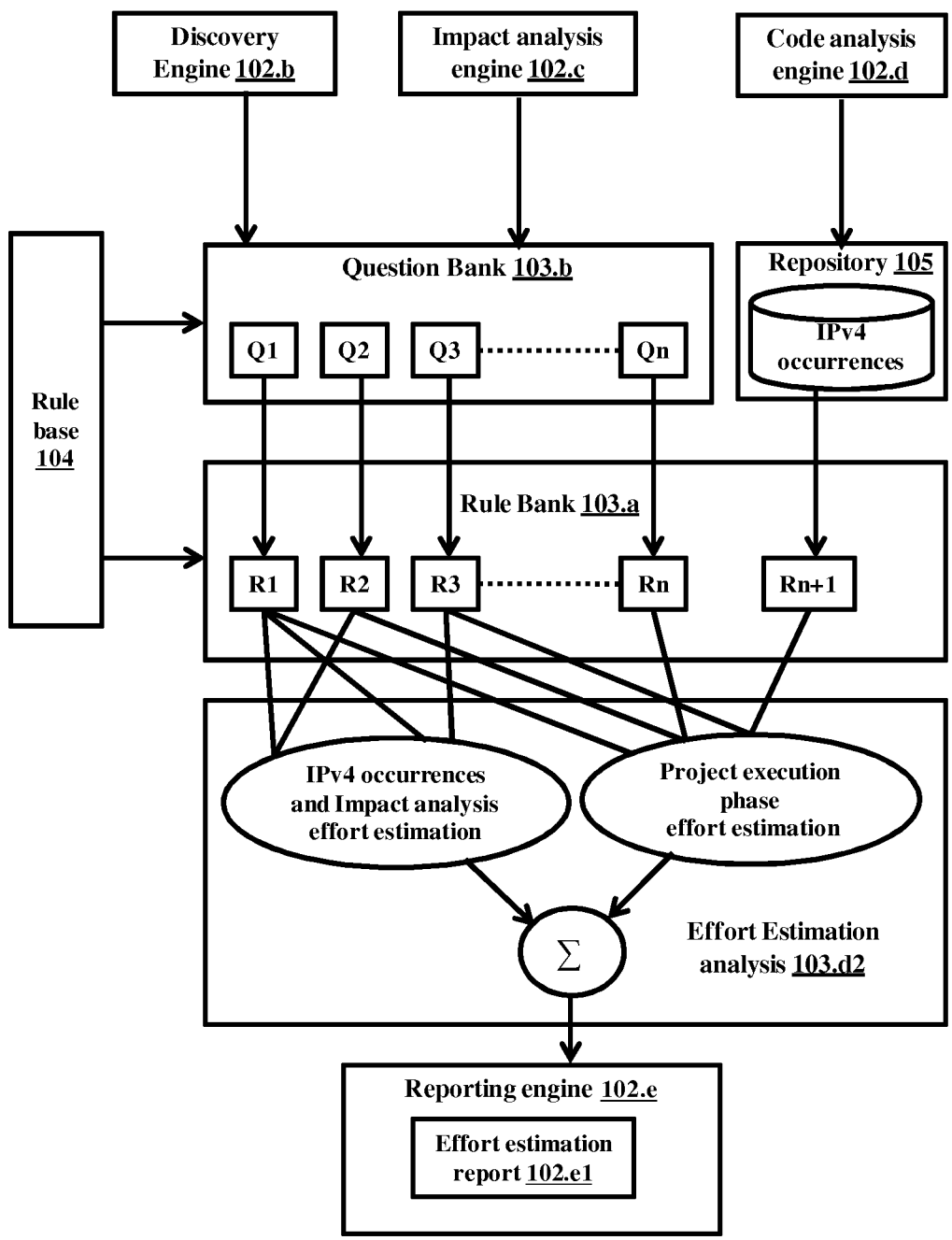
FIG. 3 illustrates a functional diagram for IPv4 Dependency Removal Effort Estimation (IDRE), according to embodiments as disclosed herein.

The FIG. 3 illustrates a functional diagram for IPv4 Dependency Removal Effort Estimation (IDRE), according to embodiments as disclosed herein. The figure depicts the discovery engine 102.b, the impact analysis engine 102.c, the code analysis engine 102d, the rule Bank 103.a, the question Bank 103.b, the rule base 104, the repository 105, the effort estimation analysis 103.d2 and the reporting engine 102.e comprising the effort estimation report 102.e1.

As described in FIG. 2 the discovery analysis engine 102.b and impact analysis engine 102.c query the user with entire set of relevant questions from the question bank 103.b. The rule bank 103.b. applies rules to the received responses accumulated in response table of the response repository 105 and then estimation 102.a assigns the weightage to every response corresponding to particular question. Some of the rules are used to configure the analyzers 103.d for analyzing the parsed code of the system artifacts to provide effort estimation analysis 103.d2. There is a one to one correspondence between the question and the rule such as Q1-R1, Q2-R2 and so on. Once, the IPv4 dependencies are detected and the corresponding system artifact is parsed to the analyzers 103d, the IPv4 occurrence analysis 103.d1 is performed on the parsed code. Thereafter, the response table of the repository 105 and rules inferred from the responses to each question to the user are utilized by effort estimation analysis 103.d2 for effort estimation of impact analysis of detected IPv4 dependencies and project execution phase detection.

The effort estimation analysis 103.d2 computes the IDRE that provides value for overall effort required to eliminate the IPv4 dependencies in the system artifact. The IDRE is computed from Analysis Effort (AE) and Project Execution Effort (PEE). The AE value provides effort for execution of discovery analysis and impact analysis phase. The PEE provides effort required for project execution phase that includes strategy planning. The IDRE is computed using equation (1) given below:

$$\text{IPv4 Dependency Removal effort estimation (IDRE)} = \text{Analysis Effort (AE)} + \text{Project Execution Effort (PEE).} \quad (1)$$

[A] Computation for the AE:

IPv4 occurrences and Impact analysis effort estimation of the effort estimation analysis 103.d2 utilizes the user input information including responses to the questionnaire, relevant information of the organization provided and the like and thereafter based on the applicable product context specific rules, the method calculates the total efforts required to carry out IPv4 occurrences and impact analysis. Thus, the final output provides volume of work at assessment and impact analysis phase. The IPv4 occurrences and impact analysis effort estimation of the effort estimation analysis 103.d2 collects the outputs for each rule R1 to Rn+1 and produces estimation at its output. This effort estimation is based on computation of an Effort Co-efficient (EC) that utilizes weighted factoring of all applicable rules from among R1 to Rn+1 and is given below in equation (2) and (3):

$$EC = A1 \times W1 + A2 \times W2 + A3 \times W3 \ldots An \times Wn \quad (2)$$

$$\text{Alternatively, written as } EC = \Sigma Ai \times Wi, i = 1 \text{ to } n \quad (3)$$

Where, Ai represent 'i'th factoring to the 'i'th rule and Wi is the corresponding weightage of the rule.

Based upon the EC and product or system domain Dj of the system artifact under consideration, Productivity to carry out Assessment & Impact analysis phase (PAI) is calculated through an index based mechanism, which is configurable and extensible across the domains. The PAI provides a value that takes into account productivity to: remove the IPv4 dependencies, modify the code of system artifacts, to carry out reverse engineering effort and to change the impacted documents. The productivity provides a measure for how well the organization performs the function. The productivity figure (value) is dependent upon the organization specific productivity factor which in turn is dependent upon the organization environment and objectives, personnel's skills about the framework 100, IPv6 experiences and domain experiences. Table 2 below provides an exemplary illustration to explain PAI concept. Terms D1, D2, D3 and D4 represent complexity involved in modification of the product with reference to the organization. The table 2 provides a chart providing person effort required for derived EC value against complexity involved with respect to the organization.

TABLE 2

| | PAI = | | | |
|---|---|---|---|---|
| EC | D1 = 3 | D2 = 1 | D3 = 2 | D4 = 4 |
| Low (0-10) | 3 weeks | 2 weeks | 3 weeks | 4 weeks |
| MEDIUM (10-40) | 5 weeks | 4 weeks | 5 weeks | 6 weeks |
| HIGH (40-100) | 7 weeks | 5 weeks | 6 weeks | 8 weeks |

Thus, the discovery and impact analysis effort which called AE, can be calculated as given in equation (4) below:

$$AE = PAI \times EC \quad (4)$$

Below is the exemplary Table 3 illustrating some of the rules which affect the assessment and planning phase where W represents the weightage W1 to Wn corresponding to rules R1 to Rn.

TABLE 3

| Rule | Impact area | Impact Details | W |
|---|---|---|---|
| R1 | Screen | Screens representing IP Address | w1 |
| R2 | Programming Styles | Programming patterns | w2 |
| R3 | Documentation of Work product | Nature of product Documentation and it's volume | . . . |
| R4 | Data Base Columns/Tables | Type of Data base and its model | |
| R5 | Third Party Software/Library/ platform | Type of third party software/ Library dependencies | |
| R6 | Proprietary Protocol | Proprietary protocol including IP Addresses | |
| R7 | Tools used for Product engineering | Impact on the product engineering tools from requirement to Validation include Configuration management etc. | w7 |
| Rn | . . . | . . . | Wn |

[B] Computation for PEE:

The project execution phase which starts from strategy planning called Project Execution Effort (PEE) considers set of components to be part of IPv4 dependency removal project execution. The PEE disclosed by the method provides completely end-to-end effort estimation including but not limited to requirement mapping, code redesign and implementation and validation testing. The PEE comprises three steps of computation.

The first step comprises computation of effort to modify the impacted code which utilizes IPv4 dependency removal system at code level and maps to the relevant applicable rules and their corresponding weightage called Code M. The second step comprises the reverse engineering effort to adapt the modified code called Code RE. The third step comprises effort to modify the impacted documents called Doc E.

[1] Effort to Modify the Impacted Code (Code M):

Code M is based on the impact identified through the framework 100 which is being analyzed during discovery and impact analysis phase of the product portfolio, through the user input and automated mode of code scan. The code is scanned through the rules and based on the weightage criteria estimation is performed for the impacted code. The code modification effort is calculated using equation (5) given below:

$$\text{Code } M = \Sigma Oi \times Si \times \{\text{Prod (per LOC)}\} \times CF \text{ where } i = 1 \text{ to } n \quad (5)$$

Oi = IPv4 Occurrence
Si = Severity/Likely hood factor
Prod {Per LOC} = Productivity Per Line of Code
CF = this competence factor for the product/system, for example CF can be categorized in 3 levels.

Severity/Likelihood factor is calculated as defined in exemplary table 4 below. The table 4 only represents the subset of impact areas and is not the limitation.

TABLE 4

| IPv4 Occurrences | Type | Severity |
|---|---|---|
| server_ip | Local Variable of type sockaddr_in | 3 |
| dbserver_ip | Global Variable of type sockaddr_in | 5 |
| 10.112.0.9 | Hard Coded IP Address | 3 |
| DisplayServerIP | Logic Displaying IP Address to screen | 6 |
| StoreInformation | Logic Storing IP Address in File | 5 |
| getConfiguration | Logic Reading IP Address from Configuration File | 6 |
| SendMessage | Logic sending proprietary protocol message containing IP Address | 5 |
| ConnectToServer | User Defined Function impact because of IPv4 specific structure and functions | 4 × Number of forward call × number of backward calls |
| Select IP from server | Data Base Query storing IP Address | 6 |
| sendSNMPMessage | $3^{rd}$ Party Library Interface Function, impact because of IP address | 4` |
| FTP 10.112.75.1 | FTP Communication and Hardcoded Address | 7 |
| http://abc.com | http communication | 6 |
| Gethostbyname | Socket Library Function | 4 |
| Update Info Set IP = %d | Data Base Update Query | 5 |
| 192.168.0.10 | Hardcoded IP Address in MakeFile | 6 |
| 192.168.0.12 | Hardcoded IP Address in Conf File | 6 |

Productivity Per Line of Code depends on the code knowledge and programming language. The table 5 below is an exemplary table for productivity values of end to end coding. The table is different for each organization, according to domain and programming language skills available within the organization.

TABLE 5

| Code Base | Small | Medium | Large |
|---|---|---|---|
| Programming Language C | 100 | 50 | 40 |
| Programming Language C++ | 1000 | 400 | 200 |
| Java | 1200 | 500 | 300 |

Competence Factor (CF) of the system or product is a factor classified against the familiarity of the product/system by the personnel or the organization executing the project. It is classified in multiple levels. The exemplary table 6 below provides various levels of CF.

TABLE 6

| Level | Description | Competence Factor |
|---|---|---|
| Level 0 | Familiarity is at the lowest level. i.e. zero familiarity of the IPv6 Domain and Product/System under modification | CF0 |
| Level 1 | Familiarity is at IPv6 technology level is good but Product/System under modification is new for the execution team. | CF1 |
| Level 2 | Familiarity is at IPv6 technology level is good but Product/System under modification is at intermediate level. | CF2 |
| Level 3 | Familiarity is at IPv6 technology level and Product/System under modification is good. | CF3 |

The values assigned to the CF are organization dependent, for example Level 0 corresponding to CF0 is assigned the largest value which implies highest amount of effort required when familiarity of organization personnel with the IPv6 domain is at lowest level.

[2] Computation of Reverse Engineering Effort (Code RE):

The reverse engineering effort required to adapt the modified impacted code (Code RE) can be estimated using various applications such as application of COCOMO-II model for COTS reuse model and the like. In an embodiment, wherein large part of product code base needs to be adapted with the impacted code the COCOMO-II model for COTS reuse model is suitable for estimation problem and calculates the adaptation effort of reuse of modified code to the large code base. Similarity of the COCOMO-II COTS model is COTS code connects over the boundary and adapted code is the function of boundary mapping for the modified code which is quite similar to IPv4 dependency removal. For example, total Line of Code (LoC) to be reverse engineered is 100K. But, the actual piece of code reverse engineered is only 15K. Then, effort estimation for reverse engineering is given as: Effort required to perform reverse engineered code+Effort required to stabilize actual reverse engineered code.

Code which is modified under the impact of IPv4 dependencies is also subset of the code with boundaries and part of the whole code affected. Thus, the IPv4 dependency does not require the complete product code reengineering unless it is part of value engineering.

Typical IPv4 dependency removal projects need to address the impacted areas and its suitable adaptation across the whole product or system base and portfolios. Henceforth, COCOMO-II COTS reuse model is utilized to compute Code RE given by equation (6) below $$\text{Code } RE = \frac{\text{Adapted } LOC \times \% \, AT}{ATPROD} \quad (6)$$

Where,
Code RE=estimation effort for code reverse engineering
ATPROD=default productivity value which can vary with technology used.
AT=percentage of code that is re-engineered.

[C] Computation of Documentation Effort (DOC E):
The equation 7 below provides estimation of DOC E:

$$\text{DOC } E = \text{No. of Document} \times \text{Weight} \times \text{Productivity} \quad (7)$$

Thus PEE can be computed from equation (5), (6) and (7) as given in equation (8) below:

$$\text{PEE} = \text{Code RE} + \text{Code } M + \text{DOC } E \quad (8)$$

Thus, the total project effort IDRE from equation (1), is calculated as given in equation (9) below:

$$\text{IDRE} = \text{AE} + \text{PEE} = \{\text{PAI} \times \text{EC}\} + \{\text{Code RE} + \text{Code } M + \text{DOC } E\} \quad (9)$$

Figure 4:
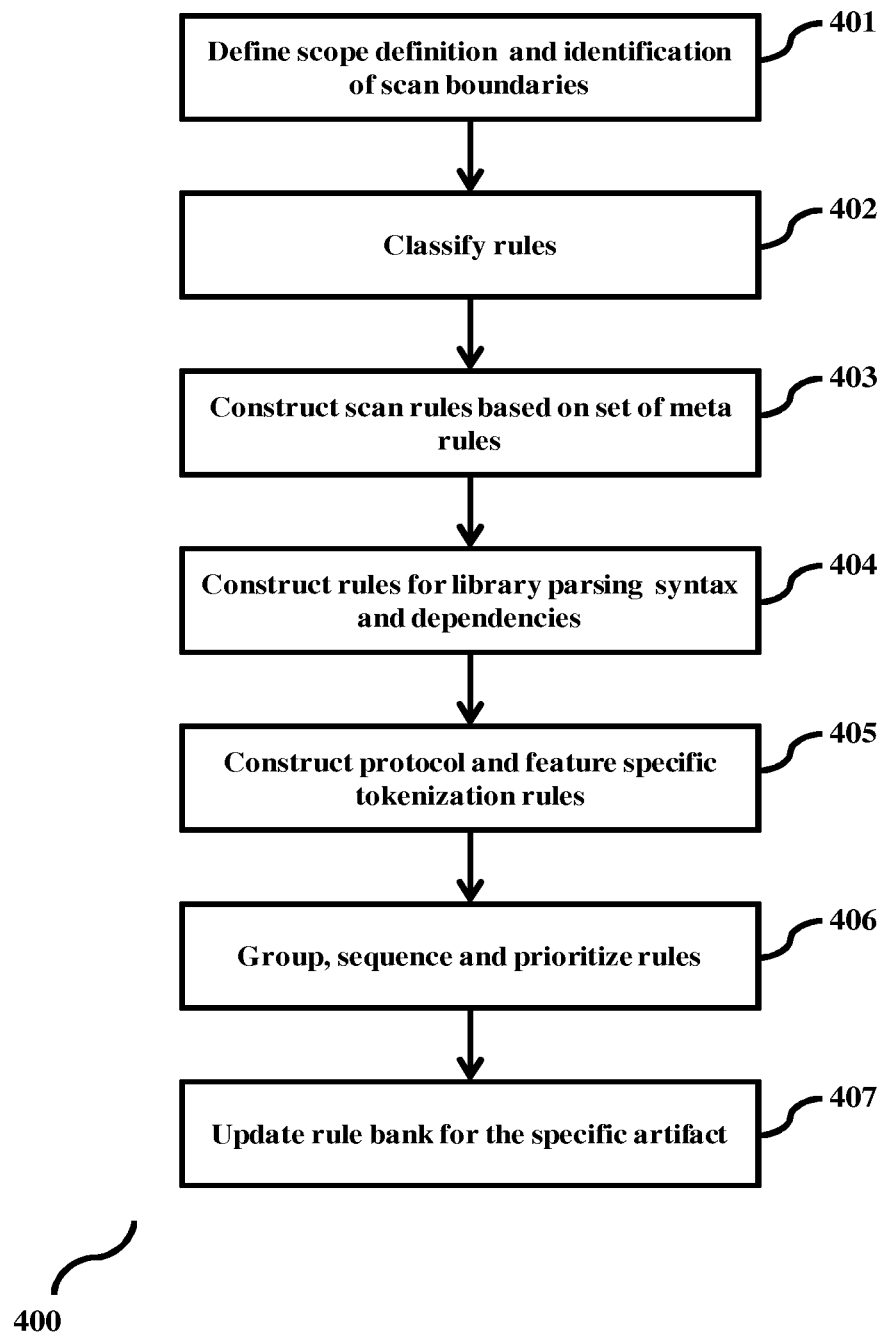
FIG. 4 illustrates a flow diagram for creation of product context specific rule bank, according to embodiments as disclosed herein.

FIG. 4 illustrates a flow diagram for creation of product context specific rule bank, according to embodiments as disclosed herein. The method utilizes the rule base/meta rule base 104 that comprises Meta information for the product context specific rules to be designed for the system artifacts requiring IPv6 migration assistance. The user responses obtained to the survey questionnaire that are stored in the response table of the repository 105 are utilized to develop the insight of system artifacts. The knowledge, along with the rule base 104 and rules for specific versions of Operating Systems, Database Engines, Language and the like are initial inputs or references to the framework 100 disclosed by the method.

As depicted in FIG. 400, with the knowledge of the system artifacts from the rule base 104 and the repository 105 the scope definition providing scope and depth of scanning of the Meta rules in the rule base 104 is defined (401). The scope definition is required for identifying the IPv4 dependencies from the received product code for the specific system artifact. The scope definition derived provides scan boundaries that indicate points where the scope of the product ends with respect to IPv4 dependency detection. Based on its identified scope, the method scans the Meta rules and filters out consolidated set of rules that are relevant for the system artifacts. The rules are further classified based on the requirements of different environmental aspects and dependencies of system artifacts. The environmental requirements for the system artifacts may include but are not limited to certain set of Operating Systems, Language, programming languages, and development and build related products, 2nd party and 3rd party products used like databases, web servers and the like. The custom defined rules for the specific version of OS, platform, DB, language and the like are also applied in the context of provided system artifacts, and the relevant set of rules are further classified in reference with these custom rules knowledge base.

Thereafter, the product context specific rule, specifically over the meta-data present in the system artifacts is constructed (403). The scan rules for scanning the Meta rules are constructed by a scan process executed over the data repositories being used in the system artifacts. The data repositories can be temporary or permanent in nature, can be structured or unstructured, and of any form such as file-based, relational databases, hierarchical databases, in-memory formats and the like. The scan process covers the scanning of the meta-data models identified for these data repositories. Based on the scan, the process identifies the relevant rules to be enforced during the process of IPv4 dependency detection. The rule identified in this process typically refers data-repository details and its meta-data references to appropriately qualify the rules for particular system artifact.

Further, the rules for library parsing syntax and dependencies are constructed (404) that prepare specific rules for covering IPv4 dependencies inflicted due to use of external libraries in the given system artifacts. The meta-rule bank maintains a repository of rules specific for the different set of external libraries typically used in system artifacts. The use of external libraries is analyzed and based on the nature of use of the libraries, the rules are derived for the specific system artifacts.

Further, protocol and feature specific tokenization rules are constructed (405). The protocols used are identified to formulate the relevant rules for detecting IPv4 dependencies in particular protocol implementations used by the system artifacts. For example, the information on the use of protocols, the versions, the external libraries or stack used, RFC compliance and interdependencies of the protocols are analyzed and the derived rules are formed with the help of these set of information. Different aspects of rules for scanning over protocol implementation are derived as a result of this step.

Then, the constructed rules (derived using pre-scanning of corresponding Meta rules) are grouped (406), sequenced and/or prioritized to derive the actual product context specific rule bank 103.a for the given system artifacts. The constructed rules are grouped, sequenced and/or prioritized in order of impact and likelihood of IPv4 dependencies. Further, appropriate weightage is assigned to the rules. The rule bank 103.a is then updated (407) with the product context specific rules with assigned weightages. The various actions in method 400 may be performed in the order presented, in a different order or simultaneously. Further, in some embodiments, some actions listed in FIG. 4 may be omitted.

For example, weightage for rule relating to Product Targeted Network and Hyper text Transfer Protocol (HTTP) Usage in product is determined from the corresponding rule of user response to selected question. Then, the Product Targeted Network rule, based on the user response to the Product Targeted Network if then else statement would be executed which helps to decide the weightage. The structure and operation of the "Product Targeted Network" rule are indicated code below.

```
[RuleDefinitionBegin]
Rule Name: Product Target Network
Description: Product/Portfolio Target For with network
IF
        [Target] = "Enterprise Network"
    Then
        Weightage = 8
    ;
IF
        [Target] = "Carriers Network"
    Then
        Weightage = 6
    ;
IF
        [Target] = "Residential Network"
    Then
        Weightage = 5
;[RuleDefinitionEnd]
```

Product Target Network rule assign weights, depending on whether the user of framework 100 characterizes the Product Target Network as enterprise network, carrier's network or residential network.

For example, weightage calculation which shows the definition of "Hyper Text Transfer Protocol (HTTP) Protocol Usage in Product" rule is provided. In code given below, if user responds to particular question, as Yes, only then the weightage is accumulated.

```
[RuleDefinitionBegin]
Rule Name: Product Use HTTP/HTTPS/HTTP Streaming
Description: Product Use HTTP/HTTPS/HTTP Streaming
IF
        [HTTP Usage] = "Yes"
Then
        Weightage = 3
;
[RuleDefinitionEnd]
```

Figure 5:
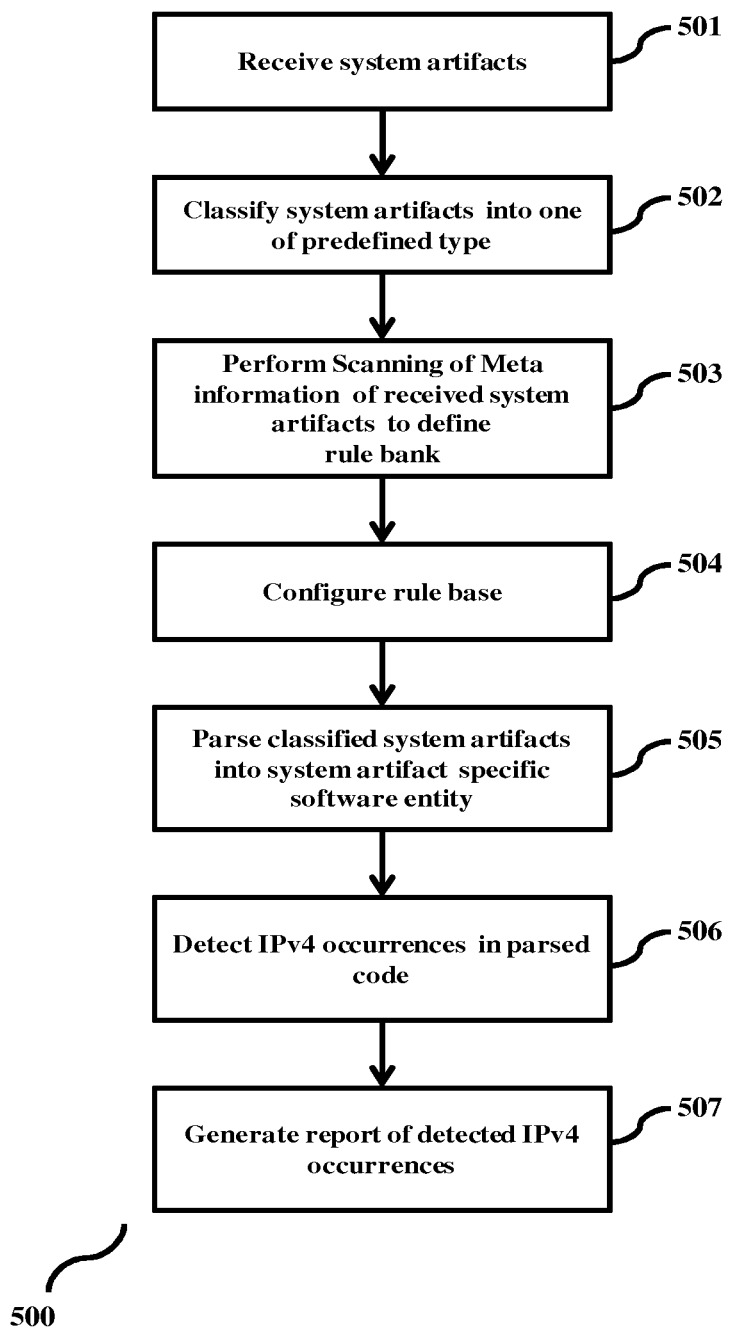
FIG. 5 illustrates a general flow diagram for IPv4 dependency detection, according to embodiments as disclosed herein.

FIG. 5 illustrates a general flow diagram for IPv4 dependency detection, according to embodiments as disclosed herein. As depicted in FIG. 500, the system artifacts to be analyzed for IPv4 dependency detection are received (501) by the frame work 100. Then, the system artifacts are classified (502) into one of predefined types. For example, the table 6 below provides plurality names and associated patterns of the plurality of the file types.

TABLE 6

| Name | Pattern |
| --- | --- |
| C++ | *.cxx, *.cc, *.cpp, *.c |
| H | *.hxx, *.hh, *.hpp, *.h |
| C | *.c |
| Java | *.java, *.JAVA |
| Asp | *.ASP, *.asp |
| Jsp | *.JSP, *.jsp |
| C | *.c |
| C# | *.cs |
| HTML | *.HTML, *.html |
| Doc | *.doc, *.docx |
| Make | *.mak, MAKEFILE |
| Text | *.txt |
| Perl | *.pl, *.PL, *.pm |
| Python | *.PY, *.py |

The pre-scanning is performed and the meta-information of the system artifacts is scanned (503) and the result of the scan is used to define the rule-bank specifically for the system artifacts provided into this system as described in FIG. 4. Further, the rule base 104 is configured (504) in accordance to response from the pre-scanning and impact analysis engine 102.*c*. Thereafter, classified code of the system artifacts that has been identified to the predefined type is analyzed, parsed (505) and the corresponding entity is built in the repository 105. The entity is built according to the format predefined for the entity. With the entity developed, the code is analyzed and IPv4 occurrences are detected (506). The analyzer 103.*d* detects the IPv4 occurrences using the entity and the set of known product context specific rules available in rule bank 103.*a*.

Thereafter, the reporting engine 102.*e* receives the detected IPv4 occurrences and a report of IPv4 occurrences is generated (507) to be displayed to the user through the GUI 101. The reports also provide visibility on the strong and/or weak nature of dependency of IPv4 occurrence based on its coupling present in other modules of the system artifacts. The various actions in method 500 may be performed in the order presented, in a different order or simultaneously. Further, in some embodiments, some actions listed in FIG. 5 may be omitted.

Figure 6:
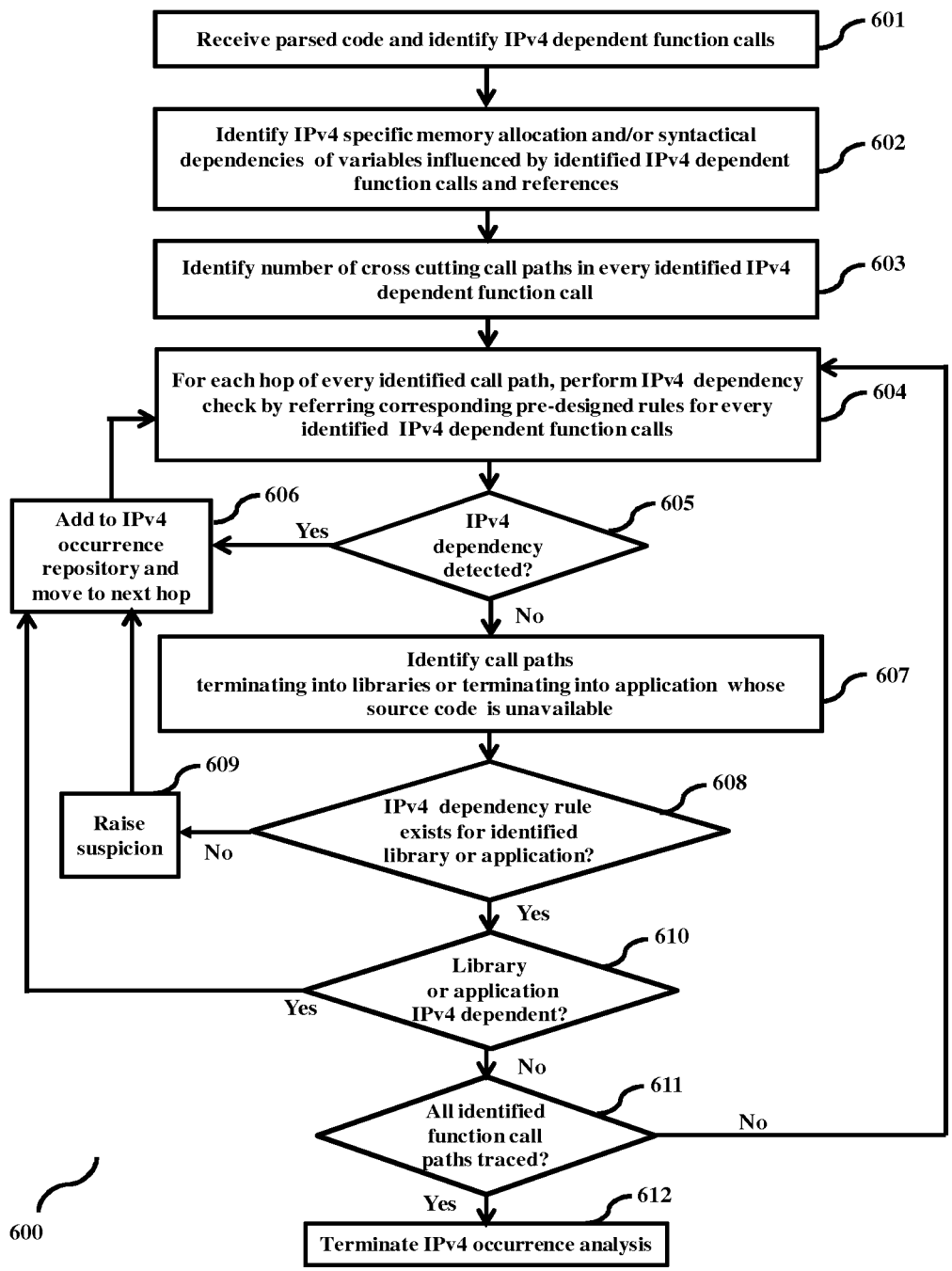
FIG. 6 illustrates the flow diagram for analyzing the detected IPv4 dependencies, according to embodiments as disclosed herein.

FIG. 6 illustrates the flow diagram for analyzing the detected IPv4 dependencies, according to embodiments as disclosed herein. As depicted in the FIG. 600, the parsed code is received (601) from the parser 103.*c*. Further, the IPv4 dependent function calls and related variable definitions and declarations are identified (602) by the IPv4 occurrence analysis 103.*d*1 of the analyzer 103.*d*. The identification process depends on the product context specific rules as configured in the rule bank 103.*a*. Once identified all of the IPv4 dependent variables or function calls are identified, the IPv4 specific memory allocation and/or syntactical dependencies of variables influenced by identified IPv4 dependent function calls and references are identified (602). The identification refers identifying call paths, which refers to identifying methods in the code class that is IPv4 dependent. Once the IPv4 dependent methods are detected then tracing is being done for other methods that are being called from the identified method, as well as identifying all other methods that call the identified method. Thus, assessment of IPv4 dependent processing and storage impacts as may be present in the detected code block of the system artifact is performed. During this process, the nature of IPv4 dependencies and constraints are referred from the constructed product context specific rule bank 103.*a*.

Thereafter, from the position of each of these impacted code blocks is taken as a reference and forward tracing and backward tracing methods are used and one or more call paths crosscutting every identified IPv4 dependent function call are identified (603). Further, at every hop of every identified crosscutting call path IPv4 dependency check is performed (604). The rules for performing the check are referred from the rule bank 103.*a*. The product context specific rules in the rule bank 103.*a* generally attribute to IPv4 dependent computation logic, syntax and syntactical IPv4 dependencies and memory reference constraints. If any matching IPv4 occurrence is detected (605), the entry is added (606) into the IPv4 Occurrences of the repository 105. The method loops back to perform (604) check for IPv4 dependencies for next hop. If an IPv4 dependency is detected (605), the termination of each call path is analyzed. The call paths terminating into libraries or terminating into application whose source code is unavailable are identified (607). For each identified library terminating call path, IPv4 dependency rule check is performed (608) by referring the rule bank to determine if the IPv4 dependency rule exists for the particular identified library or the third party software (third party application). If IPv4 dependency rule does not exists corresponding to the particular identified library, a suspicion is raised (609) and then the corresponding entry for the library is added (606) to the IPv4 occurrences in the repository 105. The method further loops back to IPv4 dependency check at the next hop and updating of the IPv4 occurrences in the repository 105 continues whenever new information of IPv4 dependency is detected.

Thus, the suspicion raised is with annotation to highlight that no conclusive decision could be taken due to absence of particular rule sets to highlight the nature of dependency on IPv4 formats for the particular library or third party software. If the IPv4 dependency rule exists for particular identified library, the library or third party application id detected (610) for IPv4 dependency. If the library is IPv4 dependent the IPv4 occurrences in the repository are updated with new corresponding entry for the identified library. The IPv4 occurrences in the repository 105 provides information about strong or weak nature of dependency of each IPv4 occurrences, by describing its forward traced and backward traced dependencies in the complete hierarchy of the system artifacts. Presence of more number of coupling or traces in the forward or backward path typically suggests a strong dependency of the IPv4 occurrence in the provided system artifact, and the same is highlighted in the reports generated by the reporting engine 102.e.

If the IPv4 dependency rule exists for particular identified library, then a check is performed (611) if all identified call paths are traced. If all call paths are traced the IPv4 dependency analysis is terminated (612), the method loops back to the hops for next identified call path. The various actions in method 600 may be performed in the order presented, in a different order or simultaneously. Further, in some embodiments, some actions listed in FIG. 6 may be omitted.

The embodiments disclosed herein can be implemented through at least one software program running on at least one hardware device and performing network management functions to control the network elements. The network elements shown in FIG. 1 include blocks which can be at least one of a hardware device, or a combination of hardware device and software module.

The embodiment disclosed herein specifies a method for rule based IPv6 migration assisting framework. The mechanism allows IPv4 dependency detection and IDRE and providing a system thereof. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for assisting migration of a network from Internet Protocol version 4 (IPv4) to Internet Protocol version 6 (IPv6), wherein said method comprises:
 defining a meta rule base comprising a plurality of rules for assisting said migration of a plurality of system artifacts associated with said network;
 constructing a context specific rule bank from said rule based meta rule base for each of said plurality of system artifacts;
 detecting a plurality of IPv4 dependencies in each of said plurality of system artifacts using corresponding context specific rule bank; and
 calculating an IPv4 Dependency Removal Effort Estimation (IDRE) for each of said plurality of system artifacts based on said detected IPv4 dependencies.

2. The method as in claim 1, wherein said context specific rule bank is constructed based on at least one of a user response to a plurality of questions in a questionnaire and at least one of a plurality of rules in said Meta rule base.

3. The method as in claim 2, wherein said constructing said context specific rule bank based on at least one of said user response to a plurality of questions in said questionnaire and at least one of said plurality of rules in said meta rule base further comprises:
 detecting a plurality of scan boundaries of said plurality of system artifacts;
 classifying meta rules for said plurality of system artifacts based on rules constructed for at least one of a library parsing syntax, said IPv4 dependencies and a protocol-feature specific tokenization; and
 grouping and sequencing said classified meta rules to generate said context specific rule bank.

4. The method as in claim 1, wherein detecting said plurality of IPv4 dependencies comprises:
 scanning a plurality of predefined meta rules; and
 building an entity by analyzing results of said scanning.

5. The method as in claim 4, wherein building said entity analyzing results of said scanning further comprises:
 identifying IPv4 dependent function calls; and
 identifying number of crosscuts to a call path of each of said identified function calls using said context specific rule bank.

6. The method as in claim 1, wherein said IDRE for each of said plurality of system artifacts is computed using an effort estimation analysis.

7. The method as in claim 6, wherein said effort estimation analysis further comprises combining at least one of an Analysis Effort (AE) and a Project Execution Effort (PEE), based on a plurality of rules associated with said context specific rule bank.

8. The method as in claim 7, wherein said AE and said PEE is computed based on weightage assigned to each rule of said context specific rule bank.

9. A system for assisting migration of a network from Internet Protocol version 4 (IPv4) to Internet Protocol version 6 (IPv6), the system comprising a hardware processor and memory that is configured for:
 defining a meta rule base comprising a plurality of rules for assisting said migration of a plurality of system artifacts associated with said network using a IPv6 migration assistance framework;

constructing a context specific rule bank from said meta rule base for each of said plurality of system artifacts using said IPv6 migration assistance framework;

detecting a plurality of IPv4 dependencies in each of said plurality of system artifacts using corresponding context specific rule bank using said IPv6 migration assistance framework; and calculating an IPv4 Dependency Removal Effort Estimation (IDRE) for each of said plurality of system artifacts based on said detected IPv4 dependencies using said IPv6 migration assistance framework.

10. The system as in claim 9, wherein said IPv6 migration assistance framework is configured to construct said context specific rule bank based on at least one of a user response to a plurality of questions in a questionnaire and at least one of a plurality of rules in said rule base using a core functionality engine.

11. The system as in claim 10, wherein said core functionality engine is further configured to construct said context specific rule bank based on at least one of a user response to a plurality of questions in a questionnaire and at least one of a plurality of rules in said rule base by:

detecting a plurality of scan boundaries of said plurality of system artifacts;

classifying meta rules for said plurality of system artifacts based on rules constructed for at least one of a library parsing syntax, said IPv4 dependencies and a protocol-feature specific tokenization; and grouping and sequencing said classified meta rules to address IPv4 dependency cross impacts.

12. The system as in claim 9, wherein said IPv6 migration assistance framework is configured to detect said plurality of IPv4 dependencies by:

scanning a plurality of predefined meta rules using a parser; and building an entity by analyzing results of said scanning using said parser.

13. The system as in claim 12, wherein said parser is further configured to build said entity analyzing results of said scanning by:

identifying IPv4 dependent function calls; and identifying number of crosscuts to a call path of each of said identified function calls using said context specific rule bank.

14. The system as in claim 9, wherein said IPv6 migration assistance framework is further configured to compute IDRE for each of said plurality of system artifacts using an effort estimation analysis using at least one of a plurality of analyzers.

15. The system as in claim 14, wherein said at least one analyzer is configured to compute IDRE using said effort estimation analysis by combining at least one of an Analysis Effort (AE) and a Project Execution Effort (PEE), based on a plurality of rules associated with said context specific rule bank.

16. The system as in claim 15, wherein said at least one analyzer is further configured to compute said AE and said PEE based on weightage assigned to each rule of said context specific rule bank.

* * * * *